United States Patent
Yang et al.

(10) Patent No.: US 8,428,313 B2
(45) Date of Patent: Apr. 23, 2013

(54) OBJECT IMAGE CORRECTION APPARATUS AND METHOD FOR OBJECT IDENTIFICATION

(75) Inventors: Tai-Chang Yang, Kaohsiung County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 382 days.

(21) Appl. No.: 12/880,299

(22) Filed: Sep. 13, 2010

(65) Prior Publication Data

US 2011/0129127 A1 Jun. 2, 2011

(30) Foreign Application Priority Data

Nov. 27, 2009 (TW) .............................. 98140624 A (51) Int. Cl.
*G06K 9/00* (2006.01)
(52) U.S. Cl.
USPC .......................................... 382/118; 382/103
(58) Field of Classification Search .................. 382/103, 382/115, 118
See application file for complete search history.

(56) References Cited

U.S. PATENT DOCUMENTS

| | | | | |
|---|---|---|---|---|
| 7,254,253 | B2* | 8/2007 | Higaki et al. | 382/103 |
| 7,574,037 | B2* | 8/2009 | Hidai et al. | 382/159 |
| 7,751,599 | B2* | 7/2010 | Chen et al. | 382/118 |
| 7,809,159 | B2* | 10/2010 | Ishiyama | 382/103 |
| 7,991,200 | B2* | 8/2011 | Ito | 382/115 |
| 8,379,986 | B2* | 2/2013 | Tsurumi | 382/203 |
| 2005/0213818 | A1* | 9/2005 | Suzuki et al. | 382/190 |

* cited by examiner

*Primary Examiner* — Gregory M Desire
(74) *Attorney, Agent, or Firm* — Rosenberg, Klein & Lee (57) ABSTRACT

An object image correction apparatus and method for object identification are disclosed. The object image correction method is firstly used for correcting a face or an object under a right position. For example, in order to reduce time consumption for facial identification, the method corrects the deviations such as a rotation, direction, and scaling before an identification process. Preferably, an image is retrieved in a first step. One or more object positions are then detected. Next, some positions of the features are found, and the positions of plural feature points thereon are computed. The method then goes to determine the degree of deviations for the object based on the positions of feature points. Moreover, one or in combination of a rotation correction, a scaling correction, a direction correction, and a shift correction is introduced to process the correction on each deviation. The positions of the feature points are consequently obtained.

20 Claims, 7 Drawing Sheets

OBJECT IMAGE CORRECTION APPARATUS AND METHOD FOR OBJECT IDENTIFICATION

BACKGROUND OF THE INVENTION

1. Field of the Invention

The present invention generally relates to a method for correcting an object image for identification. More particularly, the invention relates to the method for performing shifting, rotation, scaling, or/and direction corrections on a specific object image before image identification, in order to reduce time consumption for identification.

2. Description of Related Art

Facial identification in the application of safety management becomes more sophisticated. In the conventional way of identification, a database of digitized facial features is usually established at first step. In practical, the face image of a user is captured through a camera lens, and the facial features, such as eyes, nose, and mouth, are retrieved. The retrieved features are then compared with the features registered in the database for determining the privilege of specific resource.

In the procedure of basic comparison, it is difficult to identify the face since the scale of the inputted facial frame is different from the image registered in the database, or the frame deviates left or right. For solving the mentioned problem, an instant scaling or shifting correction of the face image is necessary for the identification. After that, an accurate result can be obtained in comparison with the data in database.

However, the process of identification needs to spend a lot of time and repeat the comparison procedure if the image does not undergo the correction of scaling or shifting. For example, if the time spent for once comparison is t, the time may be number or hundreds of times as processing scaling and shifting adjustment.

Figure 1:
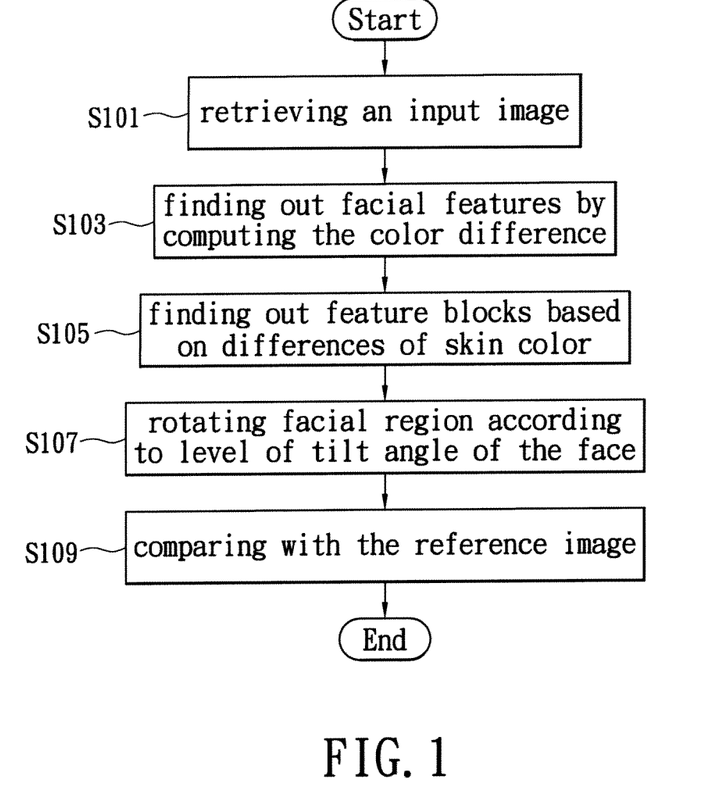
FIG. 1 shows a flow chart of the conventional method for positioning the facial feature in an image.

The facial identification technology in the prior art may be referred FIG. 1, which illustrates a method for positioning a facial feature in an image. A background image of an inputted image is eliminated, and the direction of face is corrected in a pre-process. The corrected image is then compared with a reference image marked with a human's face. The method separately calculates the changes of the pixel columns and the pixels of the reference image and the inputted image. The corresponding relation there-between may be obtained. Therefore, an image with marked facial feature may be retrieved.

In the beginning of the steps, an inputted image is retrieved in step S101. Since the inputted image covers the whole picture, the background colors may interfere with the process of face identification except for the human face. Thus, the method is to compute the color difference, and to find out the distribution of the facial features through the edge of color palette. For example, the skin color difference may be used to find out the face region of the inputted image (step S103). In the example, a mean-shift algorithm is used to process a color segment on the inputted image based on a skin color model. After analysis and comparison, the background noise can be filtered out, so as to obtain the facial region near the skin color in the image.

Next, the method goes to identify the position of the facial feature within the facial region, such as the position of eyes, nose, or mouth. That is to find the feature blocks based on the differences of skin color on each region (step S105).

Because the facial region may be slanted, the face should be aligned to correct the direction before the process of comparison. Such as step S107, it's to rotate the facial region according to the level of a tilt angle of the facial feature. After that, the corrected image is compared with the reference image marked with the facial feature, and the correlation there-between is found (step S109).

It is noted that the recognition can be enhanced and makes time reduction when the image is adjusted based on the registered image in the database.

SUMMARY OF THE INVENTION

When an object-identification procedure is in progress for identifying a human face or a specific object, especially for face identification, too large or too small facial frame, or its shifting or rotation may influence the performance of identification. Therefore, some corrections before identifying progress become helpful. Such as up-to-down or left-to-right shifting correction, facial scaling correction, and rotation correction may be performed during the identification process. After one-by-one comparison, a suitable image for identification is produced.

Some conventional technologies for correcting the facial image have been disclosed, especially under the progress for real-time identification since the human face or specific object on the image may not be accurately aligned to an image recorder. It is an object of the present invention to provide an object image correction apparatus and method for identification.

Regarding a real-time recorded image, it may have deviations in comparison with a default position of a facial frame. The faces on the image may have shifting, scaling, rotation, or direction deviations. Since the faces to be identified can be performed after performing a shifting correction, a scaling correction, a rotation correction and/or a direction correction beforehand, the further identification may not be redundant or spend too much time.

One particular aspect of the present invention is to provide a correction method before an identification of an object so as to reduce time consumption and have better performance. The corrections may be performed based on the mentioned conditions of deviations. According to the preferred embodiment of the present invention, an image capturing unit in a correction device is firstly used to capture an image. An object-position identifying unit is then used to detect one or more objects on the image. While one or more objects is detected, an object frame is instantly simulated. The detected object can be shifted to a suitable position relative to the frame.

Next, an object-feature identifying unit is to identify features of the object. After that, a feature-position computing unit is used to detect the positions of object features. The positions, such as the relative positions or coordinates, of a plurality of feature points of each object feature are obtained.

A position-deviation judging unit then determines the degree of deviations according to the positions of the feature points. The obtained degree of deviations is then compared with a corresponding default value with non-deviation. Accordingly, one or in combination of a shift correction process, a rotation correction process, a scaling correction process, and a direction correction process is employed to perform the corresponding correction(s). Consequently, the plural positions of feature points may be corrected. These correction processes may advantage the further identification performance.

One of the preferred embodiments of object image correction method for identification of the present invention is particularly adapted to a facial identification. The image capturing unit captures an image firstly, on which one or more positions of faces are detected. The positions of a plurality of facial features are also detected, especially the eyes and mouth. After that, the positions of the plural feature points of each facial feature may also be computed. Reference is made to the human eyes or mouth, the coordinates of the two eyes or the corners of mouth are firstly found.

Next, a degree of deviation of the object is determined in accordance with the positions of feature points. In which, the positions of the points are referred to determine a shift deviation of the object. A shift correction process may be correspondingly performed. Further, a facial rotation deviation may be corrected by performing a rotation correction process. Still further, the positions of feature points are used to determine a facial scaling deviation, and a corresponding correction may be performed. Further, a width-length ratio of a polygon formed by connecting the points may be used to determine a facial direction deviation. A direction correction process is correspondingly performed. After the corrections, the last positions of the feature point are obtained.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

While the present invention will be described more fully hereinafter with reference to the accompanying drawings, in which a preferred embodiment(s) of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

A facial identification technology has been applied to some products, such as some digital cameras. The specific camera may determine a shot angle by referring to the facial identification. The facial identification may be used to perform a light metering or focusing as photographing. When the facial identification is adapted to a security system, it may implement the information management, access security, or image tracking.

While an object-identification procedure for human face or any object, the procedure may firstly position a human face or a specific object. An object frame is preferably defined at first step. The identification procedure may be performed within this frame. However, the too large size, too small size, any direction shifting or rotation of the face (or object) may influence the performance of identification or the success. An object image correction apparatus or a method for the same are provided to perform prior corrections before the identification process, such as to perform a correction on the position deviation of the object. The deviations, in practice, are the up-to-down or left-to-right shifting, rotation, scaling and direction deviations. The corrections are performed on those deviations in order to obtain a corrected image better for image identification. It may prevent the unnecessary cost or time consumption on redundant comparisons during the identification procedure.

In a conventional case without the prior corrections, time t is required for once comparison as performing a real-time identification. Further, k1 times of comparisons are necessary to correct the image deviations. The comparison performed on a face needs a total time $T=k1*t$. If $t=30$ ms and $k1=125$ times, total time $30*125=3750$ ms (around 3.7 seconds) in the condition of without prior corrections is required for performing the comparison of the face. However, in the condition of performing the prior corrections according to present invention, time t is required for once comparison. Comparisons with k2 times are used for identification. Meanwhile, the time for prior correction is s. Therefore, the total time for identification needs $T=k2*t+s$. For example, if $t=30$ ms, $k2=27$ times, and $s=20$ ms, the total time for one time identification with the comparisons and the prior correction requires $30*27+20=830$ ms (around 0.8). The example shows the improvement made by the present invention.

Figure 2:
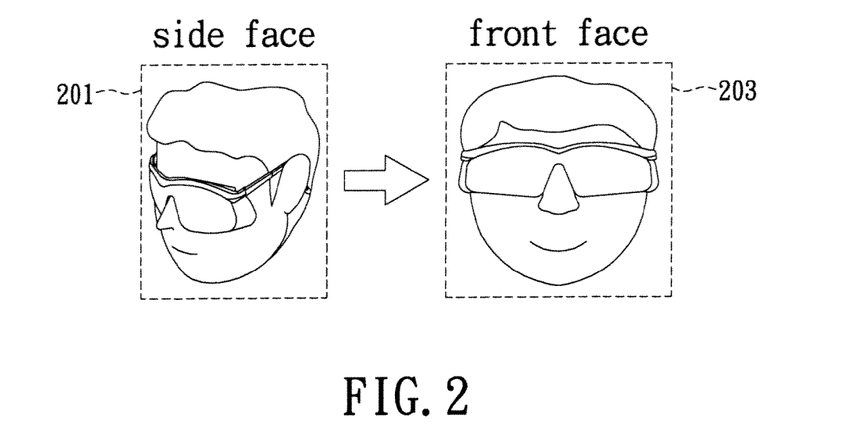
FIG. 2 shows a schematic diagram of side face correction in the method of the present invention.

FIG. 2 shows a schematic diagram of a side face correction. The figure is a side face which requiring a correction. An object, such as the face, in a captured image often has side face which needs to be identified, especially for a real-time identification. In order to enhance the accuracy of identification and reduce the time, the side face numbered as 201 may be corrected to the face shown as numeral 203.

Figure 3:
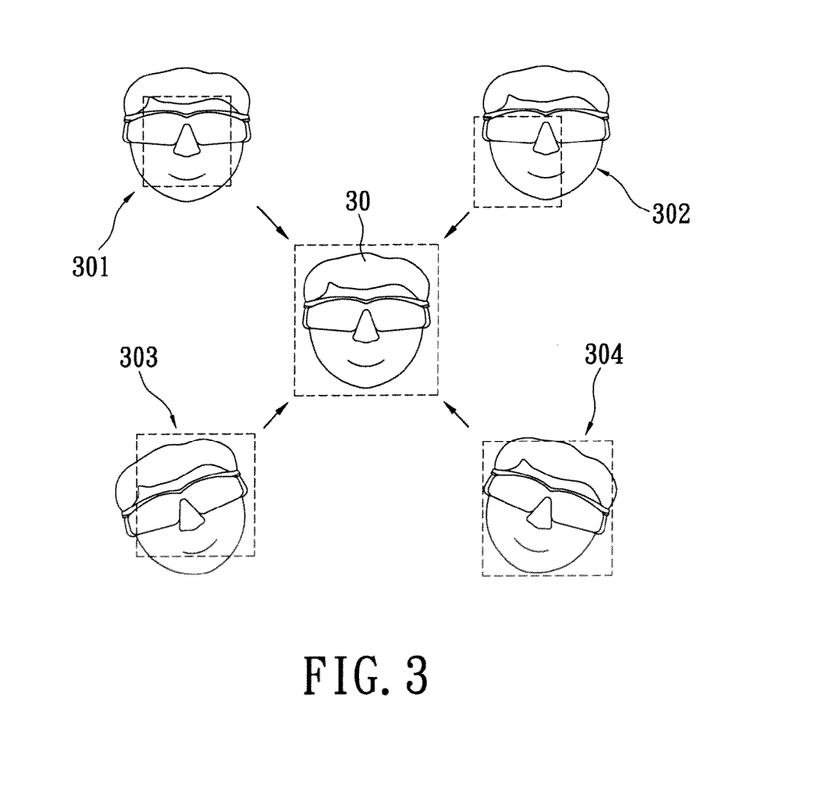
FIG. 3 shows the diagram of application of shifting, scaling, and rotation corrections in the method of the present invention.

Reference is made to FIG. 3 showing schematic diagram of the present invention providing shifting, scaling, and rotation corrections. After the image is captured, the position of an object is identified, and a human face is an exemplary example. In the meantime, an object frame used as a reference position is simulated thereon, especially made by software. The figure further describes the progress of performing every type of corrections prior to identification process. In which, the numeral 301 indicates that there is a scaling deviation between the captured face and the object frame, or said facial frame. So a scaling correction is required to correct the position of the face. The numeral 30 shows the relationship between the face and the object frame. The numeral 302 indicated that there is a shifting deviation between the face and the object frame in addition to the scaling deviation. Therefore, a scaling correction and a shifting correction are required to get the correct position (30). Refer to numeral 303, a rotation deviation and a shifting deviation happen on the face relative to the object frame. In the meantime, a rotation correction and a shifting correction are required to get the correct position (30). Furthermore, the numeral 304 shows a rotation deviation happens to the face in the object frame, and the rotation correction is required to this situation.

Figure 4A:
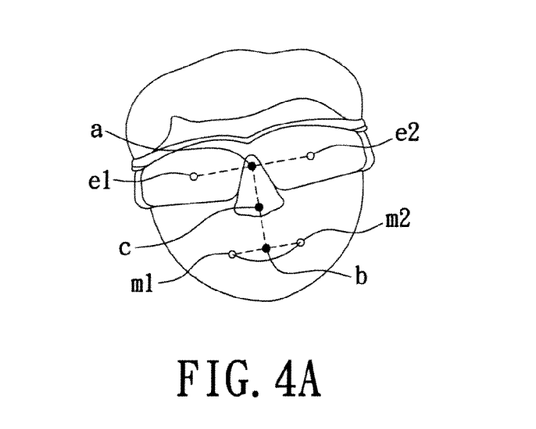
FIG. 4A is a schematic diagram of searching a facial center in accordance with the present invention.

When the position of the specific object or the face is obtained, a plurality of feature points of the object or face are found by means of identification. These feature points are used to determine the every type of deviations. Reference is made to FIG. 4A showing the feature points of a face. Especially, there is a facial center required for the rotation correction.

The features on a face generally include eyes and a mouth. The feature points are configured to a pair of eyes, which are respectively marked as e1 and e2, and two corners of the mouth which are marked as m1 and m2. While corrections are performed, it is able to determine the deviations based on the scale of the feature points and the object frame. For example, an included angle between a connection linked with the two eyes e1 and e2 and a horizontal line is referred to determine a rotation deviation. Moreover, the eyes e1 and e2, and the corners m1 and m2 of the mouth are used to determine the direction (side face) deviation. Alternatively, the position of mouth or a midpoint between two corners can also be used to make the determination. Furthermore, the distance between the two eyes e1 and e2, or any distance between other like feature points may be used to determine the scaling deviation.

According to the present example, a midpoint of the connection between the center "a" of eyes and the center "b" of mouth corners is regarded as a central point of the whole face. This central point is a center "c" of rotation, and thereby a rotation correction is performed to correct the rotation deviation for future identification.

Figure 4B:
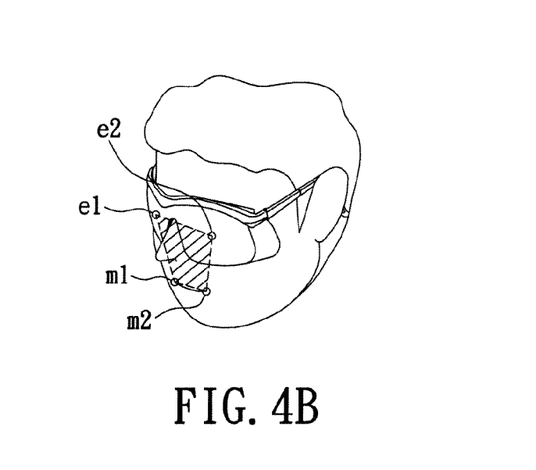
FIG. 4B shows a schematic diagram using a keystone correction of the present invention.

FIG. 4B further describes a diagram of a direction correction being performed on the direction deviation of the side face. A polygon is formed by the lines interlinked with the eyes e1 and e2, the corners m1 and m2 of the mouth or the center of mouth corners. The polygon, including a triangle, is particularly used to determine a degree of direction deviation. Preferably, a front face without direction deviation is configured. The feature points on the face may be interlinked to form a polygon, which may approach to an equilateral trapezoid or an equilateral triangle if the face is the front face. Through a comparison, such as to measure an area or other geometric computation, the degree of direction deviation may be measured. After that, it is to correct the positions of whole pixels of the object based on the degree of deviations.

Figure 4C:
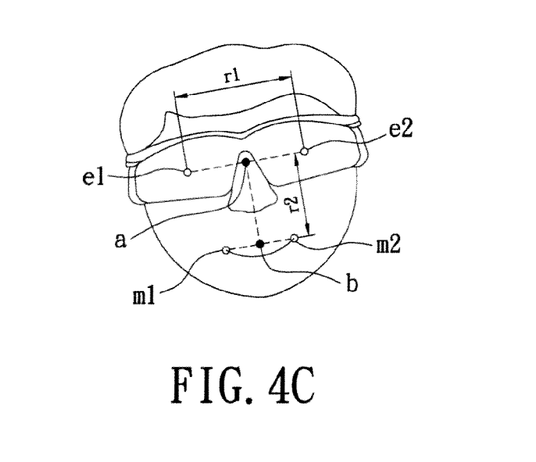
FIG. 4C is a schematic diagram using a width-length ratio in accordance with the present invention.

Reference is made to FIG. 4C describes another scheme of identifying a direction deviation by referring to the positions of feature points. A midpoint of the connection between the eyes e1 and e2 is marked as "a". A first distance "r1" of the connection is then defined. The midpoint of connection of the mouth corners m1 and m2 is "b". The connection interlinked between the point "a" and the point "b" forms a second distance "r2". A ratio of the first distance "r1" to the second distance "r2" is used define a width-length ratio. The width-length ratio changes as to different angles. After computation, the width-length ratio is in comparison with the width-length ratio of a front face. The degree of deviation regarding the side face may be obtained.

Figure 5:
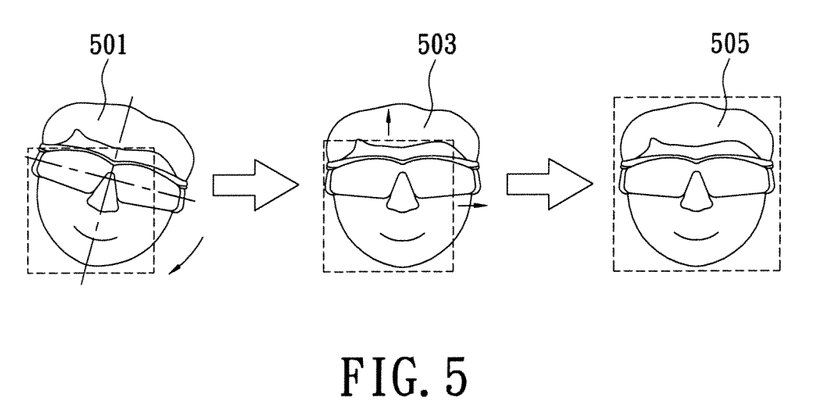
FIG. 5 shows a schematic diagram of the method for processing rotation and scaling in accordance with the present invention.

FIG. 5 further shows the schematic diagrams of the processes of rotation, and scaling corrections. The numeral 501 indicates that there is a scaling deviation between the captured face and the facial frame. A rotation deviation with an angle relative to a horizontal line is shown. After the rotation correction, the face may be adjusted to the level of horizon, such as the diagram with numeral 503. After that, it is to adjust the scaling ratio, so as to position the face within the object frame, such as the diagram with numeral 505.

Figure 6:
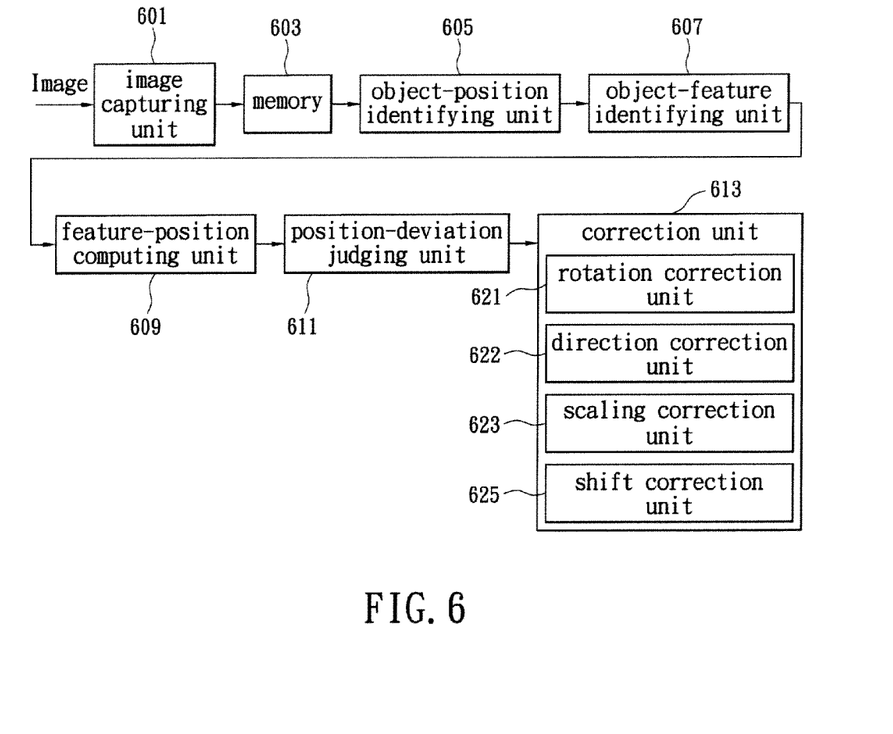
FIG. 6 shows a schematic diagram of the image correction apparatus used for identifying the object image in according to the present invention.

An object image correction apparatus shown in FIG. 6 is provided to implement the above-described corrections. By means of the apparatus for identifying the object, it is an object to rapidly perform the procedures of capturing, identifying, and correcting an image.

An image capturing unit 601 is used for capturing the image, and buffered the image being digitized in a memory 603. Preferably, a lens installed with CCD or CMOS is used to capture the image. An object-position identifying unit 605 is used for reading image signals buffered in the memory 603. After that, an image processing procedure is introduced to identify the position of an object in the image. In an exemplary example, one or more positions of the faces are identified. One preferred embodiment is to find out the features distributed over the face by analyzing the edge features for each pixel's color. Accordingly, the foreground and the background scenes may be determined. The position of the object may be positioned based on the difference between the foreground and background scenes. Then an object frame is simulated by a software-implemented means. The object frame is regarded as a basis for defining an identification range. If it is necessary, the object frame may be shifted to the position of the object.

An object-feature identifying unit 607 is further used for receiving the position of the object mad by the object-position identifying unit 605 and identifying the object features within the object frame. The features may be the eyes, nose, mouth, or other facial features. The technologies developed for identifying the facial feature may be the conventional art which is known by the skilled person in the art.

While the object features have been identified, a feature-position computing unit 609 is then used for computing the positions of the object features, which include the specific feature points. According to the preferred embodiment, the positions of object features may be the positions of the two eyes, which may be marked with coordinates relating pupils of the eyes. Further, the positions of object features may be the positions of the corners of the mouth. Those feature points, but not limited to, are regarded as the basis for further corrections.

A position-deviation judging unit 611 is then incorporated to determining whether the object has a position deviation by referring to the object features, such as to determine the degree of deviations of the feature points on the object or face.

With Respect to a Shift Deviation:

According to the positions of the object, such as the positions of eyes or mouth on the face, the degree of shift deviation may be determined. The provided shift deviation correction is used to shift the object to a suitable position for applicably performing other corrections.

With Respect to a Direction Deviation:

The reference positions of the two eyes and the positions of the corners of the mouth may be interlinked to form a polygon. Then the side-by-side ratios among the sides of the polygon are computed. A width-length ratio, which is compared with a standard ratio, is capable of determining whether the object has direction deviation, and the degree of deviation. Preferably, a trapezoid is formed by connecting those reference points. A regular face generally forms an equilateral trapezoid but not an oblique trapezoid. Therefore, the comparison of the measured trapezoid to the equilateral trapezoid may be used to determine the degree of direction deviation.

With Respect to a Scaling Deviation:

Since the object should be in the object frame for further identification, the object may be under a scaling correction firstly. In an embodiment, the distance between the two eyes and two mouth corners may be used to determine whether the object is too large or too small. Therefore, the scaling deviation may be identified.

With Respect to Rotation Deviation:

The rotation deviation may be determined by referring to the lines interlinked with the reference points. In an embodiment, an included angle between the line linked with the two eyes and a horizontal line is defined (a deviation range is configured) to determine whether there is a rotation deviation.

After determining the types of deviations and the degree of each deviation, a correction unit 613 performs the corrections on every type of deviation. Particularly, one or in combination of the shown rotation correction unit 621, direction correction unit 622, scaling correction unit 623, and shift correction unit 625 is introduced in accordance with the present invention. One object may have one or more mentioned deviations.

With Respect to Shift Deviation:

The shift correction unit 625 is performed to adjust the object into a suitable position. In a preferred embodiment, the shift correction may be performed after the positions of the two eyes are found. Other facial features may be used to determine the position of the object. A shift correction process is performed to shift the object within the object frame for other correction processes.

With Respect to Direction Deviation:

According to the determined degree of direction deviation, the direction correction unit is used to adjust the positions of pixels of the object. A default width-length ratio is defined, and the width-length ratio for the object may be adjusted to approach the corresponding default value. In particular, the reference points are interlinked to form a trapezoid, and a keystone correction is performed to correct the trapezoid. For example, the two eyes and the two corners of the mouth are linked to form an quadrilateral which may be corrected to approach an equilateral trapezoid.

With Respect to Scaling Deviation:

The scaling correction unit 623 performs a scaling correction on the scaling deviation. The pixels of the object are proportionally scaled by the correction. In a preferred embodiment, the distance between the two eyes and the mouth is in comparison with a default distance. The scaling correction unit 623 then performs a scaling correction process.

Figure 7:
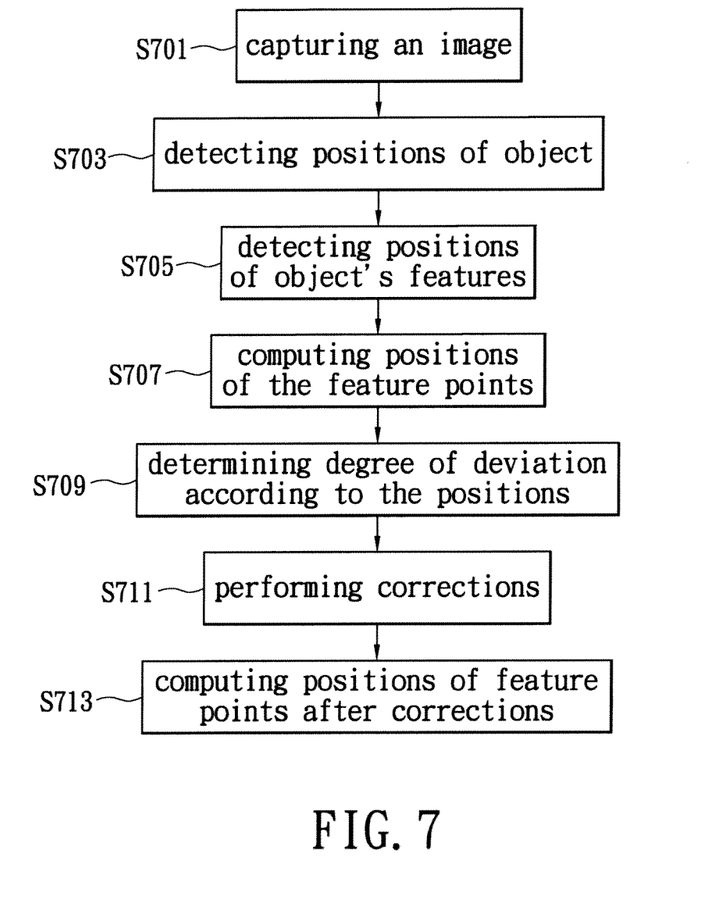
FIG. 7 shows one of the flow charts of the method for correcting the object image for identification in accordance with the present invention.

With Respect to Rotation Deviation:

After the angle of rotation deviation is obtained, the rotation correction unit 621 may be used to correct the positions of pixels of the object. Then the angle may be approached to an angle it should be. For example, the connection between the two eyes should approach to a horizontal level. The positions of eyes and mouth are referred to find a center of rotation. Based on the center of rotation, the rotation correction unit performs a rotation correction process. The application of the object image correction apparatus is to correct the object image for further identification. Reference is made to FIG. 7 illustrating a flow chart of the correction method.

Step S701 shows a beginning step, in which an image capturing unit and its lens are used to capture an image. Then one or more interested objects and their positions thereon are detected (step S703).

After that, the positions of the specific object's features are detected in reference with the object's property (step S705). Then the relative positions of the feature points retrieved from the object are computed (step S707). Through the computation, the object's degree of deviation may be determined according to the positions of the feature points (step S709).

In an exemplary example, the distance between any two feature points may be used to determine the degree of shifting deviation. Such as the positions of eyes, mouth or other recognizable facial features may be used to determine the degree of shifting deviation.

Next, the ratio of the distances between any two feature points may be used to determine the degree of direction deviation. For example, the width-length ratios of the lines interlinked with the plurality of feature points are computed for determining the degree of object's direction deviation.

In the meantime, the difference between any distance between any two of the plurality of feature points and the corresponding default distance may be used to determine the scaling deviation. More, the included angle between any two lines interlinked with the feature points may be used to determine the rotation deviation. Preferably, the object's rotation deviation is determined by computing the angle between any two lines among the feature points.

Then the correction is performed (step S711) according to the above-mentioned one or more deviations and the related degrees of deviations. The method may firstly perform a shifting correction process if it is necessary in order to adjust the object to a suitable position, such as the configured object frame.

Next, a direction correction process is performed to correct the direction deviation. In a preferred embodiment, the width-length ratio of any one connection between any two feature points is firstly compared with a corresponding default width-length ratio. Meanwhile, the width-length ratio may be adjusted to approach the default value. Therefore, the direction correction can be accomplished.

Moreover, a scaling correction process is performed to correct the scaling deviation. The distance between any two of the plurality of feature points is preferably compared with a default distance. The ratio of the measured distance to the corresponding default distance may be referred to perform the scaling correction. Therefore, the adjustment may make the object into the object frame.

Next, a rotation correction process is performed to correct the rotation deviation. Preferably, a central point of the object is computed according to the positions of the plurality of feature points. This central point may be regarded as a center of rotation. About the center of rotation, the rotation deviation may be corrected by the rotation correction in reference with an angular deviation of rotation.

At last, the step S713 in the method is to compute the positions of feature points after the corrections. Through the mentioned correction steps, the corrected object features are in comparison with the registered object features for further identification. Therefore, the method in the present invention can enhance the identification accuracy and the performance.

Figure 8:
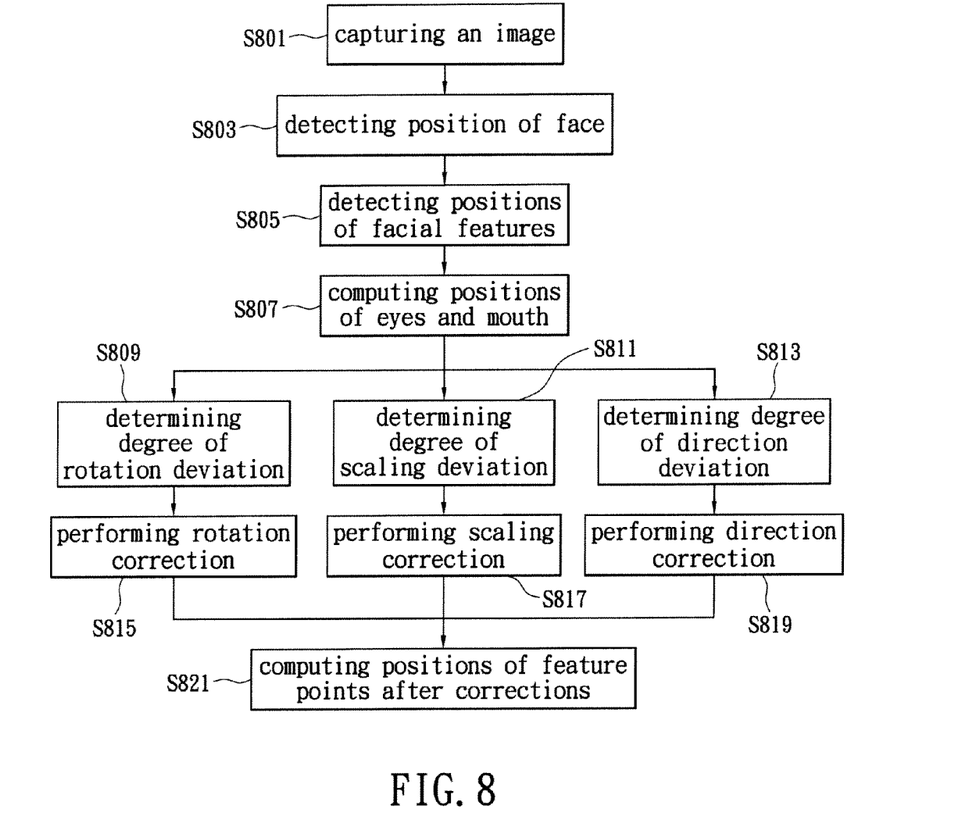
FIG. 8 shows the other one of the flow charts of the method for correcting the object image for identification in accordance with the present invention.

Reference is made to FIG. 8 illustrating a flow chart of the object image correction method for identification in accordance with the present invention. A face is into consideration.

In the beginning step S801, an image is captured. Next, such as step S803, it is to detect the position of the face. In an exemplary example, the color difference between the foreground and the background scene may be used to determine the position of the face. Furthermore, a virtual facial frame, such as the object frame, is generated by simulation. This frame is a reference range for further identification. After the position of face is determined, the positions of features of the face may be detected (step S805). The features may be the eyes or mouth on the face.

Next, the step S807 in the method is to compute the positions of feature points, such as the two eyes and the corners of the mouth. The feature points may be referred to the positions of the two eyes, and the positions of the two corners of the mouth. These feature points are referred to determine the degree of rotation deviation (step S809). For example, the angle between the line linked with the two eyes and a horizontal line is computed, and thereby to determine the object's rotation deviation.

Through the distance between any two feature points may be used to determine the degree of scaling deviation (step S811). The distance between the two eyes is compared with a default distance, and then the scaling deviation of the face may be computed.

Or alternatively, a width-length ratio of the lines interlinked with any two feature points may be used to determine the degree of direction deviation (step S813). For example, the two eyes and the two corners of the mouth are interlinked to form a polygon. The area of the polygon or the width-length ratio may be used to determine the degree of deviation of side face.

After that, any specific correction is performed on each deviation. Such as step S815, the rotation correction is performed corresponding to the rotation deviation determined in step S809. Firstly, the positions of the two eyes and two corners of the mouth are computed to obtain a central point of the face. The central point is regarded as a center of rotation for performing the rotation correction.

In step S817, the scaling correction is performed on the scaling deviation which is determined in step S811. In an exemplary example, the length of connection between the two eyes is compared with a default length, preferably within the scale of the facial frame, and the scaling correction is correspondingly performed.

In step S819, the direction correction is performed on the direction deviation determined in the step S813. The correction preferably employs a keystone correction performed on a quadrilateral formed by the connections of the two eyes and two corners of mouth. Or alternatively, the correction is performed to adjust the object based on the measured width-length ratio. Therefore, the side face is adjusted to a front face.

At the final step, the method is to compute the positions of feature points after corrections (step S821).

To sum up, the object image correction apparatus and the method in accordance with the present invention are disclosed. More particularly, the invention is applied to the correction procedures prior to the facial identification. The invention corrects the facial positions using the object detection beforehand, so as to save the time consumption of facial identification.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. An object image correction method for object identification adapted to an object image correction apparatus, comprising:
   in the object image correction apparatus, an image capturing unit capturing an image at least having an object and the image is buffered in a memory of the object image correction apparatus;
   in the object image correction apparatus, an object-position identifying unit detecting one or more object positions in the image retrieved from the memory;
   in the object image correction apparatus, an object-feature identifying unit detecting positions of a plurality of object features;
   in the object image correction apparatus, a feature-position computing unit computing positions of a plurality of feature points of the object features;
   in the object image correction apparatus, a position-deviation judging unit determining a degree of each deviation of the object according to the plurality of feature points by comparing the deviation with a default value with non-deviation, in which one or in combination of two or more processes including a shift correction process, a rotation correction process, a scaling correction process, and a direction correction process are performed; and
   computing positions of the plurality of feature points after one or more corrections made by a correction unit of the object image correction apparatus, wherein the correction unit includes one or in combination of a rotation correction unit, a direction correction unit, a scaling correction unit, and a shift correction unit.

2. The method of claim 1, wherein the object is a face, and the object features include eyes and mouth.

3. The method of claim 1, wherein the step of detecting the one or more object positions in the image, the shift correction process is performed to adjust the object to a suitable position within a simulated object frame according to the one or more feature points.

4. The method of claim 1, wherein the step of determining the degree of deviation of the object comprises:
   computing one or more angles between the lines connected from any two feature points; and
   determining the object's rotation deviation according to the one or more angles.

5. The method of claim 4, wherein the rotation correction process is performed to correct the rotation deviation, and the rotation correction process further comprises:
   computing a central point of the object by referring to positions of the plurality of feature points; and
   performing a rotation correction according to the angle of the rotation deviation by referring to the central point as a center of rotation.

6. The method of claim 1, wherein the step of determining the degree of deviation of the object according to the plurality of feature points comprises:
   computing one or more distances between any two feature points; and
   determining the degree of scaling deviation according to the one or more distances.

7. The method of claim 6, wherein the scaling correction process is used to correct the scaling deviation, and the scaling correction process comprises:
   comparing one or more distances between any two feature points with a corresponding default distance; and
   performing a scaling correction according to a ratio of the distance to the default distance.

8. The method of claim 1, wherein the step of determining the object's deviation according to the positions of the plurality of feature points comprises:
   computing a width-length ratio of a plurality of lines interlinked with the plurality of feature points; and
   determining the object's degree of direction deviation according to the width-length ratio.

9. The method of claim 8, wherein the direction correction process is used to correct the object's direction deviation, and the direction correction process comprises:
   comparing the width-length ratio with a default width-length ratio; and
   adjusting the width-length ratio with the object to approach the default width-length ratio in order to accomplish the direction correction.

10. An object image correction method for identifying an object adapted to an object image correction apparatus, comprising:
- in the object image correction apparatus, an image capturing unit capturing an image and the image is buffered in a memory of the object image correction apparatus;
- in the object image correction apparatus, an object-position identifying unit detecting one or more facial positions on the image retrieved from the memory;
- in the object image correction apparatus, an object-feature identifying unit detecting positions of a plurality of facial features of the faces, wherein the facial features at least include eyes and mouth;
- in the object image correction apparatus, a feature-position computing unit computing positions of the plurality of feature points of the facial features;
- in the object image correction apparatus, a position-deviation judging unit determining one or more degrees of deviations according to the plurality of feature points, wherein the deviations include a shift deviation, a rotation deviation, a scaling deviation, and a direction deviation with regard to the one or more faces by comparing the one or more deviation with a corresponding default value with non-deviation, in which a shift correction process regarding the shift deviation, a rotation correction process regarding the rotation deviation, a scaling correction process regarding the scaling deviation, or/and a direction correction process regarding the direction deviation are performed; and
- computing the positions of the feature points after corrections made by a correction unit of the object image correction apparatus, wherein the correction unit includes one or in combination of a rotation correction unit, a direction correction unit, a scaling correction unit, and a shift correction unit.

11. The method of claim 10, wherein the rotation deviation of the face is determined by computing an angular deviation of one or more lines between any two feature points, and the rotation correction process performed to correct the rotation deviation includes:
- obtaining a central point of the object according to positions of the feature points; and
- performing the rotation correction according to the angle of the rotation deviation by referring the central point as a center of rotation.

12. The method of claim 10, wherein the step of detecting the one or more facial positions, the shift correction process is performed to adjust the face to a suitable position within a simulated facial frame.

13. The method of claim 10, wherein the scaling deviation of the face is obtained by computing a degree of deviation of one or more distances between any two feature points, and the scaling correction process performed to correct the scaling deviation comprises:
- comparing the one or more distances between any two feature points with a default distance; and
- performing the scaling correction according to a ratio of the distance to the default distance.

14. The method of claim 10, wherein the facial direction deviation is determined by computing one or more width-length ratios of plural lines between any two feature points, and the direction correction process performed to correct the direction deviation comprises:
- comparing the width-length ratio with a default width-length ratio; and
- adjusting the width-length ratio to approach the default width-length ratio for accomplishing the direction correction.

15. An object image correction apparatus for identifying an object, and used for capturing, identifying, and correcting an image for fast identification, the apparatus comprising:
- an image capturing unit for capturing the image which is buffered in a memory;
- an object-position identifying unit for reading image signals buffered in the memory, and identifying a position of the object in the image by performing an image processing procedure;
- an object-feature identifying unit for receiving the position of the object from the object-position identifying unit and identifying the object features;
- a feature-position computing unit for computing the positions of the object and the object features;
- a position-deviation judging unit determining whether the object has a position deviation by referring to the object features; and
- a correction unit for correcting deviation of the object's position, wherein the correction unit includes one or in combination of a rotation correction unit, a direction correction unit, a scaling correction unit, and a shift correction unit.

16. The apparatus of claim 15, wherein the object identified by the object-position identifying unit is a face, and the object features include eyes and mouth, and the positions of the object are the positions of eyes and mouth.

17. The apparatus of claim 16, wherein the positions of eyes and mouth are used to obtain a center of rotation, and the rotation correction unit performs a rotation correction process about the center.

18. The apparatus of claim 16, wherein, a distance between the positions of eyes and/or mouth is compared with a default distance, and the scaling correction unit performs a corresponding scaling correction process.

19. The apparatus of claim 16, wherein, a width-length ratio obtained by referring to the positions of eyes and mouth is compared with a default width-length ratio, and the direction correction unit performs a direction correction process.

20. The apparatus of claim 16, wherein the shift correction unit performs a shift correction process by referring to the positions of eyes and mouth.

* * * * *